US011820951B2

(12) United States Patent
Kurth et al.

(10) Patent No.: US 11,820,951 B2
(45) Date of Patent: Nov. 21, 2023

(54) DIELECTRIC FLUIDS COMPRISING NATURAL BIO-SOURCED OIL WITH INCREASED STABILITY

(71) Applicant: CARGILL, INCORPORATED, Wayzata, MN (US)

(72) Inventors: Todd L. Kurth, Maple Grove, MN (US); Kevin R. Wirtz, Eden Prairie, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 16/982,215

(22) PCT Filed: Mar. 20, 2019

(86) PCT No.: PCT/US2019/023155
§ 371 (c)(1),
(2) Date: Sep. 18, 2020

(87) PCT Pub. No.: WO2019/183214
PCT Pub. Date: Sep. 26, 2019

(65) Prior Publication Data
US 2021/0027911 A1 Jan. 28, 2021

Related U.S. Application Data

(60) Provisional application No. 62/646,121, filed on Mar. 21, 2018.

(51) Int. Cl.
| | | |
|---|---|---|
| *C10M 137/02* | (2006.01) | |
| *H01B 3/22* | (2006.01) | |
| *H01B 3/20* | (2006.01) | |
| *C10M 101/00* | (2006.01) | |
| *C10M 105/00* | (2006.01) | |
| *C10M 105/74* | (2006.01) | |
| *C10M 111/02* | (2006.01) | |
| *H01G 4/018* | (2006.01) | |
| *H01G 4/04* | (2006.01) | |
| *H01G 9/07* | (2006.01) | |
| *C10M 169/04* | (2006.01) | |
| *C10N 40/16* | (2006.01) | |
| *H01F 27/12* | (2006.01) | |
| *H01F 27/00* | (2006.01) | |
| *C10N 30/10* | (2006.01) | |

(52) U.S. Cl.
CPC ........ *C10M 137/02* (2013.01); *C10M 101/00* (2013.01); *C10M 105/00* (2013.01); *C10M 105/74* (2013.01); *C10M 111/02* (2013.01); *C10M 169/04* (2013.01); *H01B 3/20* (2013.01); *H01B 3/22* (2013.01); *H01G 4/018* (2013.01); *H01G 4/04* (2013.01); *H01G 9/07* (2013.01); *C10M 2223/049* (2013.01); *C10N 2030/10* (2013.01); *C10N 2040/16* (2013.01); *H01F 27/00* (2013.01); *H01F 27/125* (2013.01)

(58) Field of Classification Search
None
See application file for complete search history.

(56) References Cited

U.S. PATENT DOCUMENTS

| | | | | |
|---|---|---|---|---|
| 2,643,962 | A | * 6/1953 | Lindhe | ..................... H01B 3/22 148/246 |
| 3,305,526 | A | * 2/1967 | Guttag | .................. C07F 9/6574 528/108 |
| 3,565,855 | A | 2/1971 | Meltsner | |
| 4,082,866 | A | 4/1978 | Link | |
| 4,121,352 | A | 10/1978 | Lameris | |
| 4,142,003 | A | 2/1979 | Sejpal | |
| 4,498,992 | A | 2/1985 | Garrett, Jr. | |
| 4,543,207 | A | * 9/1985 | Sato | ......................... H01B 3/22 252/570 |
| 4,857,150 | A | 8/1989 | Rival | |
| 5,260,077 | A | 11/1993 | Carrick | |
| 5,558,781 | A | 9/1996 | Buchold | |
| 5,736,915 | A | 4/1998 | Goedde | |
| 5,750,476 | A | * 5/1998 | Nibert | .................. C10M 133/12 508/291 |
| 5,766,517 | A | 6/1998 | Goedde | |
| 6,037,537 | A | 3/2000 | McShane | |
| 6,184,459 | B1 | 2/2001 | McShane | |
| 6,280,659 | B1 | 8/2001 | Sundin | |
| 6,352,655 | B1 | 3/2002 | McShane | |
| 6,398,986 | B1 | 6/2002 | McShane | |
| 6,485,659 | B1 | 11/2002 | Goedde | |
| 6,613,250 | B2 | 9/2003 | McShane | |
| 6,726,857 | B2 | 4/2004 | Goedde | |
| 6,905,638 | B2 | 6/2005 | Corkran | |
| 7,524,440 | B2 | 4/2009 | Rapp | |
| 7,651,641 | B2 | 1/2010 | Corkran | |
| 7,815,821 | B2 | 10/2010 | Rapp | |
| 7,871,546 | B2 | 1/2011 | Corkran | |

(Continued)

FOREIGN PATENT DOCUMENTS

| | | | |
|---|---|---|---|
| CA | 2731684 | A | 4/2010 |
| CN | 101278362 | A | 10/2008 |

(Continued)

OTHER PUBLICATIONS

De Maria et al. "Phospholipases and their industrial applications," Applied Microbiology and Biotechnology, Jan. 13, 2007 (Jan. 13, 20107), vol. 74, pp. 290-300.

(Continued)

*Primary Examiner* — Katie L. Hammer

(57) ABSTRACT

A dielectric fluid is provided comprising a natural bio-sourced oil and one or more compounds selected from the group consisting of phosphite compounds. It has been discovered that addition of one or more compounds selected from the group consisting of phosphite compounds to dielectric fluids comprising oil impart a stabilizing effect that reduces, inhibits or prevents formation of stray gases in the dielectric fluid during ordinary use.

13 Claims, No Drawings

(56) References Cited

U.S. PATENT DOCUMENTS

| | | |
|---|---|---|
| 8,076,123 B2 | 12/2011 | Chou |
| 8,097,187 B2 | 1/2012 | Rapp |
| 8,192,782 B2 | 6/2012 | Borch |
| 8,741,186 B2 | 6/2014 | Pulido Sanchez |
| 9,240,259 B2 | 1/2016 | Rebouillat |
| 10,712,105 B1 * | 7/2020 | Christensen ............ F28F 23/00 |
| 2002/0049145 A1 * | 4/2002 | Cannon ................ C10M 169/04 252/570 |
| 2002/0063487 A1 | 5/2002 | Leijon |
| 2002/0109128 A1 * | 8/2002 | McShane .............. H01F 27/125 252/570 |
| 2003/0164479 A1 | 9/2003 | Goedde |
| 2008/0194442 A1 * | 8/2008 | Watts ................... C10M 141/10 508/272 |
| 2008/0283803 A1 | 11/2008 | Rapp |
| 2009/0140830 A1 | 6/2009 | Amanullah |
| 2009/0270644 A1 | 10/2009 | Kano |
| 2010/0097167 A1 | 4/2010 | Corkran |
| 2011/0012071 A1 | 1/2011 | Rapp |
| 2011/0188202 A1 | 8/2011 | Han |
| 2012/0119862 A1 | 5/2012 | Franklin |
| 2012/0139679 A1 | 6/2012 | Rapp |
| 2013/0023683 A1 | 1/2013 | Ruwwe |
| 2013/0099182 A1 | 4/2013 | Rebouillat |
| 2017/0009119 A1 | 1/2017 | Hahn |
| 2018/0044606 A1 | 2/2018 | Aoki |
| 2018/0075941 A1 | 3/2018 | Martin |
| 2018/0294068 A1 | 10/2018 | Aufdembrink |

FOREIGN PATENT DOCUMENTS

| | | |
|---|---|---|
| CN | 101300644 A | 11/2008 |
| CN | 101278362 B | 6/2012 |
| CN | 102782051 B | 2/2015 |
| CN | 104508031 A | 4/2015 |
| CN | 106118833 A | 11/2016 |
| CN | 106867638 A | 6/2017 |
| DE | 202005002390 U1 | 6/2005 |
| EP | 3642275 A1 | 4/2020 |
| GB | 498215 A | 1/1939 |
| JP | 06212185 A | 8/1994 |
| JP | 2007173685 A | 7/2007 |
| JP | 5475600 B2 | 4/2014 |
| WO | 02062156 A2 | 8/2002 |
| WO | 2002062156 A2 | 8/2002 |
| WO | 2013052956 A2 | 4/2013 |
| WO | 2014100649 A1 | 6/2014 |
| WO | 2018234697 A1 | 12/2018 |
| WO | 2019183214 A1 | 9/2019 |

OTHER PUBLICATIONS

Jiang et al. Degumming of vegetable oils by a novel phospholipase B from Pseudomonas fluorescens BIT-18,: Bioresource Technology, May 26, 2011 (May 26, 2011), vol. 102, pp. 8052-8056.

* cited by examiner

DIELECTRIC FLUIDS COMPRISING NATURAL BIO-SOURCED OIL WITH INCREASED STABILITY

FIELD

In one aspect, the present invention relates to dielectric fluid compositions, including insulating oils, for use in electrical distribution and power equipment, including transformers, switching gear, and electric cables.

BACKGROUND

Dielectric (or insulating) fluids used in electrical distribution and power equipment-including transformers, switching gear and electric cables-perform two important functions. These fluids act as an electrical insulating medium, i.e., exhibit dielectric strength, and they transport generated heat away from the equipment, i.e., act as a cooling medium. When used in a transformer, for example, dielectric fluids transport heat from the windings and core of the transformer or connected circuits to cooling surfaces. Apart from possessing dielectric strength and cooling capacity, an ideal dielectric fluid for electrical equipment also exhibits little or no detrimental impact on the environment, is compatible with materials used to construct the equipment, and is relatively nonflammable.

There are a number of specific functional properties characteristic of dielectric oils. An oil's dielectric breakdown, or dielectric strength, provides an indication of its ability to resist electrical breakdown and is measured as the minimum voltage required to cause arcing between two electrodes at a specified gap submerged in the oil. The impulse dielectric breakdown voltage provides an indication of an oil's ability to resist electrical breakdown under transient voltage stresses such as lightning and power surges. The dissipation factor of an oil is a measure of the dielectric losses in the oil; a low dissipation factor indicates low dielectric loss and a low concentration of soluble, polar contaminants. The gassing tendency of an oil measures the oil's tendency to evolve or absorb gas under conditions where partial discharge is present. Likewise, stray gassing may occur as the result of thermal stress of dielectric oils (such as transformer oils), resulting in the release of hydrogen, methane, ethane, ethylene, etc.

Because one function of a dielectric fluid is to carry and dissipate heat, factors that significantly affect the relative ability of the fluid to function as a dielectric coolant include viscosity, specific heat, thermal conductivity, and the coefficient of expansion. The values of these properties, particularly in the range of operating temperatures for the equipment at full rating, must be weighed in the selection of suitable dielectric fluids for specific applications.

In addition to the foregoing properties that affect heat transfer, a dielectric fluid should have a relatively high dielectric strength, low dissipation factor, a dielectric constant that is compatible with the solid dielectric, a low gassing tendency, and it must be compatible with the electrical equipment materials to which it is exposed. Control of stray gassing prevents buildup of explosive gases in the head space of electrical equipment.

A dielectric fluid for use in electrical equipment comprising a vegetable oil or vegetable oil blend and comprising one or more antioxidant compounds is described in U.S. Pat. No. 7,651,641 to Corkran, et al.

SUMMARY

A typical practice in preparation of dielectric fluids to reduce the effects of oxidative degradation is to add a di-tertbutylphenol-based antioxidant. These antioxidants act by extracting a hydrogen radical from the peroxide formed during oxidation, and sequestering the radical. The resulting quinone methides and stilbenquinones are highly colored, which is considered detrimental in certain dielectric fluid applications or in situations where color interferes with visualization of oil quality. In addition, passivators, such as aryl-triazines, have been added to dielectric fluids to reduce the catalysis of oxidative degradation by dissolved metals and metal surfaces, thus prolonging the life of the antioxidant.

Oils used as dielectric fluids, e.g. mineral oils, synthetic esters, and in particular bio-sourced oils, have limitations of stability when used as dielectric fluids. Thermal degradation is evidenced by generation of stray gases selected from hydrogen, methane, ethane, and ethylene. Stray gassing is measured in accordance with ASTM D3612-02, Method C. Oxidative degradation in particular increases the hydrogen and ethane concentrations of thermal degradation, and is often accompanied by generation of organic acids, alcohols and peroxides. Ionizing degradation from partial discharge (leakage of electrons) is evidenced by hydrogen and methane, and arching and static discharge is accompanied by generation of hydrogen and acetylene.

It has been discovered that addition of a phosphite component comprising one or more phosphite compounds to dielectric fluids comprising oils imparts a stabilizing effect that reduces, inhibits or prevents formation of stray gases in the dielectric fluid during ordinary use. While not being bound by theory, it is believed that addition of one or more compounds selected from the group consisting of phosphite compounds to dielectric fluids imparts a stabilizing effect prior to formation of peroxides, thereby advantageously preventing formation of gases.

In an aspect, a dielectric fluid is provided comprising an oil and one or more compounds selected from the group consisting of phosphite compounds. In an aspect, a dielectric fluid is provided comprising an oil and one or more compounds selected from the group consisting of phosphite compounds, and further comprises a non-phosphite antioxidant component selected from one or more non-phosphite antioxidant compounds.

In an aspect, a dielectric fluid formulated for use in an electrical distribution or power device is provided, the dielectric fluid comprising an oil and one or more compounds selected from the group consisting of phosphite compounds.

In an aspect, a method of insulating an electrical distribution or power device is provided, comprising incorporating a dielectric fluid as described herein in the electrical distribution or power device.

In an aspect, an electrical distribution or power device is provided, comprising a dielectric fluid as described herein.

DETAILED DESCRIPTION

The aspects of the present invention described below are not intended to be exhaustive or to limit the invention to the precise forms disclosed in the following detailed description. Rather a purpose of the aspects chosen and described is by way of illustration or example, so that the appreciation and understanding by others skilled in the art of the general principles and practices of the present invention can be facilitated.

In an aspect, the dielectric fluid comprises an oil selected from the group consisting of a bio-sourced oil, a synthetic ester oil, mineral oil, and mixtures thereof.

In an aspect, the dielectric fluid comprises a bio-sourced oil. For purposes of the present disclosure, a bio-sourced oil is an oil derived from vegetable or animal sources. In an aspect, the bio-sourced oil is a refined, bleached and deodorized ("RBD") oil. In an aspect, the dielectric fluid comprises at least 75% by weight of a bio-sourced oil. In an aspect, the dielectric fluid comprises at least 85% by weight of a bio-sourced oil. In an aspect, the dielectric fluid comprises at least 90% by weight of a bio-sourced oil. In an aspect, the dielectric fluid comprises at least 95% by weight of a bio-sourced oil. In an aspect, the dielectric fluid comprises at least 98% by weight of a bio-sourced oil. In an aspect, the only oil in the dielectric fluid is a bio-sourced oil.

Bio-sourced oils are particularly desirable for use in the present dielectric fluid, because they are derived from renewable resources and are generally readily biodegradable. In an aspect, bio-sourced oils have the additional property of increasing paper stability in transformer applications. Bio-sourced oils bring the benefit of high flash and fire point properties, low ignitability, and low fire propagation unlike mineral oils. The flash, fire point, and ignitability of synthetic esters are highly dependent upon composition. Under certain conditions, mineral oils are subject to explosions and fire propagation, acting like gasoline around ignition sources. Bio-sourced oils comprising unsaturation provide beneficial flow properties, with decreasing viscosity of the oil correlating to increased unsaturation.

In an aspect, the oil in the dielectric fluid is a natural bio-sourced oil, meaning that it is obtained from the vegetable or animal source that has not been modified by reactive chemistry, for example, by transesterification or formation of oil derivative products. For clarity, it is understood that a vegetable or animal oil that is modified by interesterification (i.e., redistribution of the fatty acid moieties present in a triglyceride oil over its glycerol moieties) is considered to be a natural bio-sourced oil. Additionally, it is understood that a vegetable or animal oil that is obtained by extraction is considered to be a natural bio-sourced oil.

In an aspect, the dielectric fluid comprises a vegetable oil. In an aspect, the dielectric fluid comprises a vegetable oil, selected from the group consisting of castor, coconut, corn, cottonseed, crambie, flaxseed, jojoba, kukui nut, lesquerella, linseed, olive, palm, peanut, pine nut, rapeseed, safflower, sunflower, soybean, and veronica oil, and mixtures thereof. In an aspect, the only oil in the dielectric fluid is a vegetable oil. In an aspect, the only oil in the dielectric fluid is a vegetable oil selected from the group consisting of castor, coconut, corn, cottonseed, crambie, flaxseed, jojoba, kukui nut, lesquerella, linseed, olive, palm, peanut, pine nut, rapeseed, safflower, sunflower, soybean, and veronica oil, and mixtures thereof. In an aspect, the only oil in the dielectric fluid is a vegetable oil. In an aspect, the dielectric fluid comprising a vegetable oil may be provided a commercially available oil composition that is further modified by addition of phosphite compounds. For example, Envirotemp FR3 is a natural ester fluid made from soybean oil and additives (di-tert-butyl phenolic class of antioxidants, pour point additive, dye). Other similar fluids that can be derived from renewable sources include Midel eN (Rapeseed based). These materials may be modified by addition of phosphite compounds to decrease stray gassing.

In an aspect, the dielectric fluid comprises a natural oil obtained from microbes, seaweed and like organic sources.

In an aspect, the dielectric fluid comprises an animal oil. In an aspect, the only oil in the dielectric fluid is an animal oil. Representative examples of animal oils include tallow, lard, fish oil, or chicken fat.

In an aspect, the dielectric fluid comprises a synthetic oil. In an aspect, a synthetic oil is an oil that is the product of a chemical reaction involving formation of esters by reacting a polyol with saturated or unsaturated linear and branched carboxylic acids; aryl esters; C5-C12 saturated or unsaturated linear and branched esters; and mixtures thereof, or carrying out a chemical modification of source oils by reactive chemistry, for example, by transesterification or formation of oil derivative products. Thus, an oil obtained from a vegetable or animal source by chemical modification by transesterification is for purposes of the present discussion a synthetic oil. In an aspect, the dielectric fluid comprises a synthetic oil that is prepared from reactants that are derived only from vegetable or animal bio-sourced oils.

In an aspect, a synthetic ester oil comprises synthetic esters of a polyol selected from glycerol, pentaerythritol, trimethylolpropane (TMP), hydroxylated fatty acids, and polyglycerols. In an aspect, the synthetic esters are formed by reacting the polyol with compounds selected from C5-C25 saturated or unsaturated linear and branched carboxylic acids; from C5-C12 saturated or unsaturated linear and branched carboxylic acids; aryl esters; C5-C12 saturated or unsaturated linear and branched esters; C5-C25 saturated or unsaturated linear and branched esters; and mixtures thereof.

In an aspect, the dielectric fluid comprises synthetic esters selected from the group consisting of esters of C5 through C24 branched and linear aliphatic carboxylic acids with pentaerythritol, dipentaerythritol, 2,2-dimethylpropanediol, 2,2-dimethyl-3-isopropyl-1,3-propanediol, trimethylolpropane, glycerol, neopentyl glyxol, 2,2-dimethylol butane, trimethylol ethane, sorbitol, (C2 to C12 diols) ethylene glycol, propylene glycol, 1,4-butanediol, and 2-methylpropanediol, and mixtures thereof.

In an aspect, the dielectric fluid comprises synthetic esters selected from the group consisting of selected from the group consisting of esters of C5 through C24 branched and linear aliphatic alcohols and acids selected from the group consisting of adipic acid, suberic acid, azelaic acid, sebacic acid, phthalic acid, oxalic acid, glycolic acid, fumaric acid, and mixtures thereof.

In an aspect, the only oil in the dielectric fluid is a synthetic oil.

In an aspect, the dielectric fluid comprises mineral oil. In an aspect, the dielectric fluid comprises a mineral oil selected from the group consisting of straight and branched chain aliphatic paraffinic hydrocarbons, which have a molecular weight of about 220 to about 700; or from about 500 to about 700. In an aspect, the dielectric fluid comprises a mineral oil having a fire point of from about 120° C. to about 250° C.; or having a fire point of from about 140° C. to about 200° C. In an aspect, the dielectric fluid comprises a mineral oil having a fire point above 200° C. In an aspect, the dielectric fluid comprises a mineral oil selected from the group consisting of naphthenic hydrocarbon oils having similar characteristics and mixtures of the aforementioned paraffinic and naphthenic hydrocarbons, such as described in U.S. Pat. No. 4,082,866, the disclosure of which is incorporated herein by reference. In an aspect, the only oil in the dielectric fluid is a mineral oil.

In an aspect, the dielectric fluid comprises a mixture of a bio-sourced oil and a mineral oil. In an aspect, the dielectric fluid comprises a mixture of a vegetable oil and a mineral oil. In an aspect, the dielectric fluid comprises a mixture of a synthetic ester oil and a mineral oil. In an aspect, the dielectric fluid comprises a mixture of a synthetic ester oil and a bio-sourced oil. In an aspect, the dielectric fluid comprises a mixture of a synthetic ester oil and a vegetable oil. In an aspect, the dielectric fluid comprises a mixture of a synthetic ester oil, a bio-sourced oil, and a mineral oil. In an aspect, the dielectric fluid comprises a mixture of a synthetic ester oil, a vegetable oil, and a mineral oil.

It has been found that increased unsaturation and branching in oils is tied to increased stray gassing. In oils comprising significant amounts of unsaturation and branching, addition of phosphite compounds to decrease stray gassing becomes more important. It is noted that oils that have a relatively low amount or no unsaturation, (e.g. having a Iodine Value of less than 50) strongly benefit by incorporation of phosphite compounds as described herein. However, oils that have a relatively high amount of unsaturation even more significantly benefit from addition of phosphite compounds to decrease stray gassing. In an aspect, the dielectric fluid comprises an oil having an IV of from 50 to 200. In an aspect, the dielectric fluid comprises an oil having an IV of from 80 to 200. In an aspect, the dielectric fluid comprises an oil having an IV of from 100 to 200. In an aspect, the dielectric fluid comprises an oil having an IV of from 110 to 200.

For purposes of the present disclosure, "Iodine Value" (IV) is defined as the number of grams of iodine that will react with 100 grams of material being measured. Iodine value is a measure of the unsaturation (carbon-carbon double bonds and carbon-carbon triple bonds) present in a material. Iodine Value is reported in units of grams iodine ($I_2$) per 100 grams material and is determined using the procedure of AOCS Cd Id-92.

In an aspect, the dielectric fluid is free of silicone compounds, or is free of phospholipids, or is free of pigments, or is free of lecithin, or is free of fatty acids, or is free of mono- and di-glycerides, or is free of acids, or is free of alcohols, or is free of colored impurities, or is free of sulfur compounds, or is free of cresols, or is free of polyaromatic hydrocarbons, or is free of acids, or is free of halogenated compounds, or is free of amines. In an aspect, the dielectric fluid comprises a natural bio-sourced oil and is free of phospholipids, or is free of pigments, or is free of lecithin, or is free of fatty acids, or is free of mono- and di-glycerides. In an aspect, the dielectric fluid comprises a synthetic ester oil and is free of acids, or is free of alcohols, or is free of colored impurities. In an aspect, the dielectric fluid comprises a mineral oil and is of sulfur compounds, or is free of cresols, or is free of polyaromatic hydrocarbons, or is free of acids, or is free of halogenated compounds, or is free of amines.

In an aspect, the dielectric fluid comprises an oil that is highly purified. For purposes of the present disclosure, an oil is "highly purified" if the oil is treated on a clay medium (such as silicates, aluminates, and the like) to remove polar compounds and impurities, followed by filtration to substantially remove particles that would be retained by a 1 micron filter. In an aspect, the dielectric fluid comprises a biosourced oil that is highly purified.

It has been discovered that it is advantageous when selecting the oil to be used in the dielectric fluid, that the oil has a low initial peroxide value so that undesirable side reactions and gas evolution may be avoided from the start. It is preferred that the peroxide values in transformer oils be kept low by degassing and maintaining an inert (nitrogen blanketed) headspace, so that the additives are spent on the targeted oil maintenance during use, and are not spent on correcting oil conditions that accrue prior to their introduction into the application. Over time of exposure of the dielectric fluid to atmosphere or oxidizing conditions, the peroxide value of the oil in the dielectric fluid may increase, for example, from a very low initial peroxide value of less than about 1 to a higher peroxide value of about 8 or 10 or even higher. It has been discovered that phosphite compounds are particularly effective in inhibiting gas generation in dielectric fluids where the oil has an initial peroxide value of less than 5, or where the oil has an initial peroxide value of less than 3, or where the oil has an initial peroxide value of less than 2, or where the oil has an initial peroxide value of less than 1. In an aspect, the oil used in the dielectric fluid has an initial peroxide value of from about 0.01 to 5, or has an initial peroxide value of from about 0.01 to 3, or has an initial peroxide value of from about 0.01 to 2, or has an initial peroxide value of from about 0.01 to 1, or has an initial peroxide value of from about 0.1 to 1. For purposes of the present disclosure, "peroxide value" is determined by AOCS Method Cd 8b-90. It should be noted, however, that dielectric fluids having a high initial peroxide value exhibit reduction in stray gassing by addition of phosphite compounds as described herein.

In an aspect, the dielectric fluid comprises one or more compounds selected from the group consisting of phosphite compounds.

In an aspect, the phosphite component is present in an amount sufficient to reduce the hydrogen ($H_2$) gassing of the dielectric fluid as determined by dissolved gas analysis (ASTM D3612-02, Method C) by at least 60% as compared to a like dielectric fluid composition that does not contain a phosphite component. In an aspect, the phosphite component is present in an amount sufficient to reduce the $H_2$ gassing of the dielectric fluid as determined by dissolved gas analysis by at least 70% as compared to a like dielectric fluid composition that does not contain a phosphite component. In an aspect, the phosphite component is present in an amount sufficient to reduce the $H_2$ gassing of the dielectric fluid as determined by dissolved gas analysis by at least 80% as compared to a like dielectric fluid composition that does not contain a phosphite component.

In an aspect, the phosphite component is present in an amount sufficient to reduce the ethane gassing of the dielectric fluid as determined by dissolved gas analysis (ASTM D3612-02, Method C) by at least 60% as compared to a like dielectric fluid composition that does not contain a phosphite component. In an aspect, the phosphite component is present in an amount sufficient to reduce the ethane gassing of the dielectric fluid as determined by dissolved gas analysis by at least 70% as compared to a like dielectric fluid composition that does not contain a phosphite component. In an aspect, the phosphite component is present in an amount sufficient to reduce the ethane gassing of the dielectric fluid as determined by dissolved gas analysis by at least 80% as compared to a like dielectric fluid composition that does not contain a phosphite component.

In an aspect, the phosphite component is present in an amount sufficient to reduce the methane gassing of the dielectric fluid as determined by dissolved gas analysis (ASTM D3612-02, Method C) by at least 60% as compared to a like dielectric fluid composition that does not contain a phosphite component. In an aspect, the phosphite component is present in an amount sufficient to reduce the methane gassing of the dielectric fluid as determined by dissolved gas analysis by at least 70% as compared to a like dielectric fluid composition that does not contain a phosphite component. In an aspect, the phosphite component is present in an amount sufficient to reduce the methane gassing of the dielectric fluid as determined by dissolved gas analysis by at least 80% as compared to a like dielectric fluid composition that does not contain a phosphite component.

In an aspect, the phosphite component is present in an amount sufficient to reduce the ethylene gassing of the dielectric fluid as determined by dissolved gas analysis (ASTM D3612-02, Method C) by at least 60% as compared to a like dielectric fluid composition that does not contain a phosphite component. In an aspect, the phosphite component is present in an amount sufficient to reduce the ethylene gassing of the dielectric fluid as determined by dissolved gas analysis by at least 70% as compared to a like dielectric fluid composition that does not contain a phosphite component. In an aspect, the phosphite component is present in an amount sufficient to reduce the ethylene gassing of the dielectric fluid as determined by dissolved gas analysis by at least 80% as compared to a like dielectric fluid composition that does not contain a phosphite component.

In an aspect, the phosphite component is present in an amount sufficient to reduce the hydrogen gassing of the dielectric fluid as determined by dissolved gas analysis (ASTM D3612-02, Method C) by at least 60%, and additionally the ethane gassing of the dielectric fluid as determined by dissolved gas analysis (ASTM D3612-02, Method C) by at least 60% as compared to a like dielectric fluid composition that does not contain a phosphite component. In an aspect, the phosphite component is present in an amount sufficient to reduce the hydrogen gassing of the dielectric fluid as determined by dissolved gas analysis by at least 70%, and additionally the ethane gassing of the dielectric fluid as determined by dissolved gas analysis by at least 70% as compared to a like dielectric fluid composition that does not contain a phosphite component. In an aspect, the phosphite component is present in an amount sufficient to reduce the hydrogen gassing of the dielectric fluid as determined by dissolved gas analysis by at least 80%, and additionally the ethane gassing of the dielectric fluid as determined by dissolved gas analysis by at least 80% as compared to a like dielectric fluid composition that does not contain a phosphite component.

In an aspect, the phosphite component is present in an amount of from 0.05 to the limit of solubility in the dielectric fluid. In an aspect, the phosphite component is present in an amount of from 0.1 to the limit of solubility in the dielectric fluid. In an aspect, the phosphite component is present in an amount of from 0.05 to 4% wt. In an aspect, the phosphite component is present in an amount of from 0.05 to 3% wt. In an aspect, the phosphite component is present in an amount of from 0.05 to 2% wt. In an aspect, the phosphite component is present in an amount of from 0.05 to 1.5% wt. In an aspect, the phosphite component is present in an amount of from 0.05 to 1% wt. In an aspect, the phosphite component is present in an amount of from 0.05 to 0.5% wt. In an aspect, the phosphite component is present in an amount of from 0.1 to 4% wt. In an aspect, the phosphite component is present in an amount of from 0.1 to 3% wt. In an aspect, the phosphite component is present in an amount of from 0.1 to 2% wt. In an aspect, the phosphite component is present in an amount of from 0.1 to 1.5% wt. In an aspect, the phosphite component is present in an amount of from 0.1 to 1% wt. In an aspect, the phosphite component is present in an amount of from 0.1 to 0.5% wt.

In an aspect, the dielectric fluid comprises one or more compounds selected from the group consisting of phosphite compounds that are Water Stable. For purposes of the present disclosure, a phosphite compound is defined as Water Stable if when a solid sample of the phosphite compound is placed in an 85% relative humidity chamber at 60° C. and sampled for determination of % hydrolysis as a function of time, the sample hydrolyzes no more than 30% in 80 minutes.

In an aspect, the dielectric fluid comprises one or more compounds selected from the group consisting of phosphite compounds selected from the group consisting of phosphite esters, triarylphosphites, trialkylphosphites, cyclic phosphites, bis-arylphosphite pentaerythritol cyclic esters, and the like.

In an aspect, the phosphite component is selected from the group consisting of from phosphite compounds having one to three aryloxy groups. In an aspect, the phosphite component is selected from aryl phosphite compounds. In an aspect, the phosphite component is selected from triaryl phosphite compounds. In an aspect, the phosphite component is selected from the group consisting of from phosphite compounds that are cyclic esters and bis-arylphosphite pentaerythritol cyclic esters. In an aspect, the phosphite component is selected from the group consisting of cyclic aryl phosphites, cyclic alkyl-aryl phosphites, aryl cyclic phenoxy phosphites, bis aryl phosphites, alkyl aryl phosphites, and mixtures thereof.

In an aspect, the phosphite component is selected from the group consisting of tris-(2,4-di-tert-butylphenyl)phosphite (commercially available, for example, as Irgafos 168); bis (2,4-dicumylphenyl pentaerythritol diphosphite (commercially available, for example, as Doverphos S-9228); tris-nonylphenylphosphite (commercially available, for example, as Adela ADK Stabilizer 1178 or Doverphos 4); 1,3,7,9-tetratert-butyl-11-(2-ethylhexoxy)-5H-benzo[d][1,3,2]benzodioxaphosphocine (commercially available, for example, as Amfine HP-10); 3,9-bis(2,6-di-tert-butyl-4-methylphenoxy)-2,4,8,10-tetraoxa-3,9-diphosphaspiro[5.5]undecane (commercially available, for example, as Amfine PEP-36A); bis(2,4-di-tert-butylphenol)pentaerythritol diphosphite commercially available as Irgafos 126); 4,4'-Isopropylidenediphenol C12-15 alcohol phosphite (commercially available, for example, as Amfine 1500); 3,9-diphenoxy-2,4,8,10-tetraoxa-3,9-diphosphaspiro[5.5]undecane; 3,9-Bis(octadecyloxy)-2,4,8,10-tetraoxa-3,9-diphosphaspiro[5.5]undecane (commercially available, for example, as Amfine PEP-8); triphenyl phosphite (commercially available, for example, as Amfine TPP or Doverphos 10); isodecyl diphenyl phosphite (commercially available, for example, as Adela ADK Stabilizer 135A or Doverphos 8); phenyl diisodecyl phosphite (commercially available, for example, as Doverphos 7); diisodecyl petaerythrytol diphosphite (commercially available, for example, as Doverphos 1220); distearyl petaerythrytol diphosphite (commercially available, for example, as Doverphos S-680); trilauryl phosphite (commercially available, for example, as Doverphos 53); alkyl ($C_{12}$-$C_{15}$) bisphenol A phosphite (commercially available, for example, as Doverphos 613); alkyl ($C_{10}$) bisphenol A phosphite (commercially available, for example, as Doverphos 675); 2-ethylhexyl diphenyl phosphite (commercially available, for example, as Amfine C); 5,5-dimethyl-2-phenoxy-1,3,2-dioxaphosphorinane; methyl diphenyl phosphite; and mixtures thereof.

In an aspect, the dielectric fluid comprising phosphite compounds further comprises a non-phosphite antioxidant component that comprises one or more non-phosphite antioxidant compounds. Incorporation of one or more non-phosphite antioxidant compounds in the dielectric fluid comprising phosphite compounds has been found to compliment and further augment protection of the dielectric fluid from oxidative degradation. Additionally, incorporation of one or more non-phosphite antioxidant compounds in the dielectric fluid comprising phosphite compounds in an aspect has been found to inhibit viscosity increase over time as compared to like compositions that do not contain a non-phosphite antioxidant component. It has been found that the presence of a non-phosphite antioxidant component, and particularly phenolic antioxidant compounds, in an aspect are advantageous to provide oxidative stability in compositions that are exposed to oxygen. Thus, compositions that contain both phosphite components and a non-phosphite antioxidant component in the composition in an aspect exhibit good stray gas inhibition properties and oxidation stability as determined by measuring of the Oxidation Induction Time ("OIT") as measured under ASTM D6186-98 at the stated temperatures. The OIT test is carried out at an air pressure of 500+/−25 psig and an airflow rate of 100+/−10 ml/min.

It is noted that the presence of a conventional antioxidant (non-phosphite antioxidant compounds, especially phenolic antioxidants) does not prevent formation of peroxide, but instead acts to degrade peroxides after the peroxide is formed. Further, bio-sourced oils that have air in the headspace will increase in peroxide value over time. Oxidation can be decreased by displacing oxygen atmosphere with an inert gas, such as nitrogen or argon, and by degassing the fluid. However, often the conventional antioxidant will not effectively reduce peroxide buildup at ambient temperature. Elevated temperature is effective at increasing the interaction between the conventional antioxidant and peroxide, but also increases the rate of thermal degradation of the oil. At approximately 120° C., the rate of peroxide degradation increases to exceed the rate of peroxide formation. In the presence of conventional antioxidant, alcohols are the byproduct of peroxide degradation. In the absence of antioxidant, the peroxide species degrade to form acids.

It has been observed that increased peroxide content also contributes to increased stray gassing. However, stray gassing that arises from degradation through the peroxide formation and this form of degradation is significantly reduced by the use of phosphite compounds as described herein.

When the oil used is a mineral oil, it has been found that peroxide formation and degradation of mineral oil dielectric compositions tend to accelerate at about 120° C. For this reason, heating of a mineral oil based dielectric composition for the purpose of controlling peroxide by interaction with a conventional antioxidant in the composition is not a preferred method.

In an aspect, the additional non-phosphite antioxidant component is selected from are phenolic antioxidants, and in an aspect are di-tert-butyl phenol analogues. In an aspect, the non-phosphite antioxidant component is selected from the group consisting of butylated hydroanisole (BHA), butylated hydrotoluene (BHT), tertiary butylhydroquinone (TBHQ), tetrahydrobutrophenone (THBP), ascorbyl palmitate (rosemary oil), propyl gallate, and alpha-, beta- or delta-tocopherol (vitamin E) and mixtures thereof In an aspect, the additional non-phosphite antioxidant component is selected from the group consisting of Pentaerythritol tetrakis(3-(3,5-di-tert-butyl-4-hydroxyphenyl) propionate) (commercially available, for example, as Iganox L101, Irganox 1010, BNX 1010); Hexamethylene bis[3-(3, 5-di-tert-butyl-4-hydroxyphenyl)propionate] (commercially available, for example, as Irganox L109); Octadecyl-[3-(3, 5-di-tert-butyl-4-hydroxyphenyl)propionate] (commercially available, for example, as Irganox 1076); Ethylene bis (oxyethylene) bis-(3-(5-tert-butyl-4-hydroxy-m-tolyl)propionate) (commercially available, for example, as Irganox 245); 2,6-Di-tert-butyl-4-(4,6-bis(octylthio)-1,3,5-triazin-2-ylamino)phenol (commercially available, for example, as Irganox 565); N,N'-hexane-1,6-diylbis(3-3,5-di-tert-butyl-4-hydroxyphenylpropionamide) (commercially available, for example, as Irganox 1098); 4,6-Bis(octylthiomethyl)-o-cresol (commercially available, for example, as Irganox 1520); 4,4'-methylene-bis-2,6-di-tert.-butyl phenol (commercially available, for example, as Ethanox 4702); and 2,6-Di-tert-butyl-4-methylphenol (BHT).

In an aspect, it has been found that the amount of phosphite components in the composition, the amount of non-phosphite antioxidant components in the composition, and the relative ratio of phosphite components to non-phosphite antioxidant components within a particular range exhibit particularly excellent properties in inhibition of generation of stray gases and control of oxidative reduction. In an aspect, it has been found that incorporation of too much of the non-phosphite antioxidant components relative to the amount of phosphite components may adversely affect inhibition of generation of stray gases.

In an aspect, the phosphite component is present in an amount of from about 0.05 wt % to the limit of solubility of the phosphite component in the dielectric fluid composition, and the non-phosphite antioxidant component is present in an amount such that the ratio of phosphite component to non-phosphite antioxidant component is from 1 part phosphite component to from 0 to 1.2 parts of non-phosphite antioxidant component.

In an aspect, the phosphite component is present in an amount of from about 0.2 wt % to the limit of solubility of the phosphite component in the dielectric fluid composition, and the non-phosphite antioxidant component is present in an amount such that the ratio of phosphite component to non-phosphite antioxidant component is from 1 part phosphite component to from 0 to 1.2 parts of non-phosphite antioxidant component.

In an aspect, the phosphite component is present in an amount of from about 0.2 wt % to about 1 wt %, and the non-phosphite antioxidant component is present in an amount such that the ratio of phosphite component to non-phosphite antioxidant component is from 1 part phosphite component to from 0 to 1.2 parts of non-phosphite antioxidant component.

In an aspect, the phosphite component is present in an amount of from about 0.4 wt % to the limit of solubility of the phosphite component in the dielectric fluid composition, and the non-phosphite antioxidant component is present in an amount such that the ratio of phosphite component to non-phosphite antioxidant component is from 1 part phosphite component to from 0 to 1.2 parts of non-phosphite antioxidant component.

In an aspect, the phosphite component is present in an amount of from about 0.4 wt % to about 0.6 wt %, and the non-phosphite antioxidant component is present in an amount such that the ratio of phosphite component to non-phosphite antioxidant component is from 1 part phosphite component to from 0 to 1.2 parts of non-phosphite antioxidant component.

In an aspect, the phosphite component is present in an amount of from about 0.05 wt % to the limit of solubility of the phosphite component in the dielectric fluid composition, the phosphite component is present in an amount of from about 0.05 wt % to the limit of solubility of the non-phosphite antioxidant component in the dielectric fluid composition; and further provided that the ratio of phosphite components to non-phosphite antioxidant component is from 1 part phosphite component to from 0 to 1.2 parts of non-phosphite antioxidant component.

In an aspect, the phosphite component is present in an amount of from about 0.2 wt % to the limit of solubility of the phosphite component in the dielectric fluid composition, the phosphite component is present in an amount of from about 0.05 wt % to the limit of solubility of the non-phosphite antioxidant component in the dielectric fluid composition; and further provided that the ratio of phosphite components to non-phosphite antioxidant component is from 1 part phosphite component to from 0 to 1.2 parts of non-phosphite antioxidant component.

In an aspect, the phosphite component is present in an amount of from about 0.2 wt % to about 1 wt, the phosphite component is present in an amount of from about 0.05 wt % to the limit of solubility of the non-phosphite antioxidant component in the dielectric fluid composition; and further provided that the ratio of phosphite components to non-phosphite antioxidant component is from 1 part phosphite component to from 0 to 1.2 parts of non-phosphite antioxidant component.

In an aspect, the phosphite component is present in an amount of from about 0.4 wt % to the limit of solubility of the phosphite component in the dielectric fluid composition, the phosphite component is present in an amount of from about 0.05 wt % to the limit of solubility of the non-phosphite antioxidant component in the dielectric fluid composition; and further provided that the ratio of phosphite components to non-phosphite antioxidant component is from 1 part phosphite component to from 0 to 1.2 parts of non-phosphite antioxidant component.

In an aspect, the phosphite component is present in an amount of from about 0.4 wt % to about 0.6 wt %, the phosphite component is present in an amount of from about 0.05 wt % to the limit of solubility of the non-phosphite antioxidant component in the dielectric fluid composition; and further provided that the ratio of phosphite components to non-phosphite antioxidant component is from 1 part phosphite component to from 0 to 1.2 parts of non-phosphite antioxidant component.

In an aspect, the phosphite component is present in an amount of from about 0.4 wt % to the limit of solubility of the phosphite component in the dielectric fluid composition, the phosphite component is present in an amount of from about 0.2 wt % to the limit of solubility of the non-phosphite antioxidant component in the dielectric fluid composition; and further provided that the ratio of phosphite components to non-phosphite antioxidant component is from 1 part phosphite component to from 0 to 1.2 parts of non-phosphite antioxidant component.

In an aspect, the phosphite component is present in an amount of from about 0.4 wt % to about 0.6 wt %, the phosphite component is present in an amount of from about 0.2 wt % to the limit of solubility of the non-phosphite antioxidant component in the dielectric fluid composition; and further provided that the ratio of phosphite components to non-phosphite antioxidant component is from 1 part phosphite component to from 0 to 1.2 parts of non-phosphite antioxidant component.

In an aspect, the phosphite component is present in an amount of from about 0.4 wt % to the limit of solubility of the phosphite component in the dielectric fluid composition, the phosphite component is present in an amount of from about 0.3 wt % to the limit of solubility of the non-phosphite antioxidant component in the dielectric fluid composition; and further provided that the ratio of phosphite components to non-phosphite antioxidant component is from 1 part phosphite component to from 0 to 1.2 parts of non-phosphite antioxidant component.

In an aspect, the phosphite component is present in an amount of from about 0.4 wt % to about 0.6 wt %, the phosphite component is present in an amount of from about 0.3 wt % to the limit of solubility of the non-phosphite antioxidant component in the dielectric fluid composition; and further provided that the ratio of phosphite components to non-phosphite antioxidant component is from 1 part phosphite component to from 0 to 1.2 parts of non-phosphite antioxidant component.

In an aspect, the dielectric fluid further comprises a metal passivator. Incorporation of a metal passivator has been found to be useful in dielectric fluids, particularly for those comprising synthetic ester oils. While not being bound by theory, it is believed that metal passivators act to reduce the catalysis of oxidative degradation by dissolved metals and metal surfaces in the environment of use of the dielectric fluids. Additionally, dielectric fluid compositions as described herein that additionally comprise metal passivators have been found to exhibit low fluid dissipation factor values (and therefore reduced electrostatic charging tendency), even under conditions of long term oxidative stress.

In an aspect, the metal passivator is selected from benzotriazole or its derivatives. In an aspect, the metal passivator is selected from N,N-bis(2-ethylhexyl)-ar-methyl-1H-Benzotriazole-1-methanamine (commercially available, for example, as Irgamet 39); N,N-bis(2-ethylhexyl)-1H-1,2,4-Triazole-1-methanamine (commercially available, for example, as Irgamet 30); 1H-Benzotriazole (commercially available, for example, as Irgamet BTZ); Methyl-1H-benzotriazole (commercially available, for example, as Irgamet TTZ); butyl-1H-benzotriazole; and 2,2'-[[(methyl-1H-benzotriazol-1-yl)methyl]imino]bis-ethanol (commercially available, for example, as Irgamet 42).

In an aspect, the metal passivator is present in amount of from about 0.001 to 2 wt % of the dielectric fluid. In an aspect, the metal passivator is present in amount of from about 0.005 to 1 wt % of the dielectric fluid. In an aspect, the metal passivator is present in amount of from about 0.005 to 0.4 wt % (i.e. 50 to 4000 ppm) of the dielectric fluid.

In an aspect, when the oil of the dielectric fluid is a synthetic ester, the metal passivator is present in amount sufficient to control the dissipation value of the dielectric fluid as determined by IEC 60247 (120° C.) at or below 0.10 (10%) at 164 hours of oxidative stability testing as evaluated in accordance with by IEC 61125 Method C. In an aspect, when the oil of the dielectric fluid is a synthetic ester oil, the metal passivator is present in amount sufficient to control the dissipation value of the dielectric fluid as determined by IEC 60247 (120° C.) at or below 0.30 (30%) at 164 hours of oxidative stability testing as evaluated in accordance with by IEC 61125 Method C. In an aspect, when the oil of the dielectric fluid is a synthetic ester oil, the metal passivator is present in amount sufficient to control the dissipation value of the dielectric fluid as determined by IEC 60247 (120° C.) at or below 0.50 (50%) at 164 hours of oxidative stability testing as evaluated in accordance with by IEC 61125 Method C.

In an aspect, when the oil of the dielectric fluid is a synthetic ester, the metal passivator is present in amount sufficient to control the dissipation value of the dielectric fluid as determined by IEC 60247 (120° C.) at or below 0.30 (30%); or at or below 0.60 (60%); or at or below 0.90 (90%);

or at or below 1.0 (100%) at 800 hours of oxidative stability testing as evaluated in accordance with by, EC 61125 Method C.

In an aspect, when the oil of the dielectric fluid is a synthetic ester oil, the metal passivator is present in amount sufficient to control the dissipation value of the dielectric fluid as determined by IEC 60247 (120° C.) at or below 0.60 (60%) at 164 hours of oxidative stability testing as evaluated in accordance with by IEC 61125 Method C.

In an aspect, when the oil of the dielectric fluid is a synthetic ester oil, the metal passivator is present in amount sufficient to control the dissipation value of the dielectric fluid as determined by IEC 60247 (120° C.) at or below 0.90 (90%) at 164 hours of oxidative stability testing as evaluated in accordance with by IEC 61125 Method C.

In an aspect, when the oil of the dielectric fluid is a synthetic ester oil, the metal passivator is present in amount sufficient to control the dissipation value of the dielectric fluid as determined by IEC 60247 (120° C.) at or below 1.0 (100%) at 164 hours of oxidative stability testing as evaluated in accordance with by IEC 61125 Method C.

In an aspect, when the oil of the dielectric fluid is a bio-sourced oil, the metal passivator is present in amount sufficient to control the dissipation value of the dielectric fluid as determined by IEC 601125 (120° C.) at or below 0.50 (50%) at 48 hours of oxidative stability testing as evaluated in accordance with by IEC 61125 Method C.

In an aspect, when the oil of the dielectric fluid is a mineral oil, the metal passivator is present in amount sufficient to control the dissipation value of the dielectric fluid as determined by IEC 60247 (120° C.) at or below 0.50 (50%) at 500 hours of oxidative stability testing as evaluated in accordance with by IEC 61125 Method C.

In an aspect, the dielectric fluid components of oil selection, phosphite compounds, optional non-phosphite antioxidant components, and optional metal passivator are selected to provide specific physical properties as follows:

In an aspect, when the oil of the dielectric fluid is a bio-sourced oil or a synthetic ester oil, the dielectric fluid has a Flash Point of greater than 250° C. as determined by ISO 2719. In an aspect, when the oil of the dielectric fluid is a bio-sourced oil or a synthetic ester oil, the dielectric fluid has a Flash Point of greater than 270° C. as determined by ISO 2719. In an aspect, when the oil of the dielectric fluid is a mineral oil, the dielectric fluid has a Flash Point of greater than 135° C. as determined by ISO 2719.

In an aspect, the dielectric fluid has a Fire Point of greater than 300° C. as determined by ISO 2592. In an aspect, the dielectric fluid has a Fire Point of greater than 310° C. as determined by ISO 2592.

In an aspect, the dielectric fluid has a Pour Point of less than −5° C. as determined by ISO 3016. In an aspect, the dielectric fluid has a Pour Point of less than −10° C. as determined by ISO 3016. In an aspect, the dielectric fluid has a Pour Point of less than −20° C. as determined by ISO 3016. In an aspect, the dielectric fluid has a Pour Point of less than −25° C. as determined by ISO 3016. In an aspect, the dielectric fluid has a Pour Point of less than −30° C. as determined by ISO 3016. In an aspect, the dielectric fluid has a Pour Point of less than −45° C. as determined by ISO 3016. In an aspect, when the oil of the dielectric fluid is a bio-sourced oil or a synthetic ester oil, the dielectric fluid has a Pour Point of less than −10° C. as determined by ISO 3016. In an aspect, when the oil of the dielectric fluid comprises a soybean based oil, the dielectric fluid has a Pour Point of less than −15° C. as determined by ISO 3016, or has a Pour Point of less than −20° C. as determined by ISO 3016. In an aspect, when the oil of the dielectric fluid comprises a rapeseed based oil, the dielectric fluid has a Pour Point of less than −30° C. as determined by ISO 3016. In an aspect, when the oil of the dielectric fluid is a synthetic ester oil, the dielectric fluid has a Pour Point of less than −45° C. as determined by ISO 3016. In an aspect, when the oil of the dielectric fluid is a mineral oil, the dielectric fluid has a Pour Point of less than −40° C. as determined by ISO 3016, or has a Pour Point of less than −60° C. as determined by ISO 3016.

In an aspect, the dielectric fluid has a Water Content of less than 750 mg/kg as determined by IEC 60814. In an aspect, the dielectric fluid has a Water Content of less than 200 mg/kg as determined by IEC 60814. In an aspect, the dielectric fluid has a Water Content of less than 100 mg/kg as determined by IEC 60814. In an aspect, the dielectric fluid has a Water content of less than 60 mg/kg as determined by IEC 60814. In an aspect, the dielectric fluid has a Water content of less than 50 mg/kg as determined by IEC 60814. In an aspect, the dielectric fluid has a Water content of less than 30 mg/kg as determined by IEC 60814. In an aspect, the dielectric fluid has a Water content of less than 25 mg/kg as determined by IEC 60814. In an aspect, the dielectric fluid has a Water content of less than 20 mg/kg as determined by IEC 60814. In an aspect, the dielectric fluid has a Water content of from about 5 to 25 mg/kg as determined by IEC 60814.

In an aspect, the dielectric fluid has a color of less than 200 Hazen as determined by ISO 2211.

In an aspect, the dielectric fluid has a density of less than 1000 kg/dm$^3$ at 20° C. as determined by 3675, ISO 12185.

In an aspect, the dielectric fluid has a Kinematic viscosity of from about 1 to 15 mm$^2$/s at 100° C., or has a Kinematic viscosity of from about 1 to 35 mm$^2$/s at 40° C., or has a Kinematic viscosity of from about 20 to 35 mm$^2$/s at 40° C., or has a Kinematic viscosity of from about 100 to 3000 mm$^2$/s at −20° C. as determined by ISO 3104. In an aspect, the dielectric fluid comprises mineral oil and has a Kinematic viscosity of from about 3 to 12 mm$^2$/s at 40° C. In an aspect, the dielectric fluid comprises bio-sourced oil and has a Kinematic viscosity of from about 9 to 50 mm$^2$/s at 40° C. In an aspect, the dielectric fluid comprises vegetable oil and has a Kinematic viscosity of from about 9 to 50 mm$^2$/s at 40° C. In an aspect, the dielectric fluid comprises synthetic oil and has a Kinematic viscosity of from about 7 to 40 mm$^2$/s at 40° C.

In an aspect, the dielectric fluid has an acidity of less than 0.06 mg KOH/g as determined by AOCS Method Cd-63. In an aspect, the dielectric fluid has an acidity of less than 0.03 mg KOH/g as determined by AOCS Method Cd-63. In an aspect, the dielectric fluid has an acidity of less than 0.02 mg KOH/g as determined by AOCS Method Cd-63. In an aspect, when the oil of the dielectric fluid is a mineral oil, the dielectric fluid has an acidity of less than 0.01 mg KOH/g as determined by AOCS Method Cd-63.

In an aspect, the dielectric fluid has a Breakdown voltage of greater than or equal to 35 kV as determined by IEC 60156. In an aspect, the dielectric fluid has a Breakdown voltage of greater than 45 kV as determined by IEC 60156. In an aspect, the dielectric fluid has a Breakdown voltage of greater than 55 kV as determined by IEC 60156. In an aspect, the dielectric fluid has a Breakdown voltage of greater than 65 kV as determined by IEC 60156. In an aspect, the dielectric fluid has a Breakdown voltage of greater than 75 kV as determined by IEC 60156. In an aspect, when the oil of the dielectric fluid is a mineral oil, the dielectric fluid has a Breakdown voltage of greater than 30 kV as determined by IEC 60156. In an aspect, when the oil of the dielectric fluid is a mineral oil, the dielectric fluid has a Breakdown voltage of greater than 70 kV as determined by IEC 60156.

In an aspect, the dielectric fluid has a DC resistivity at 90° C. of greater than 2 GΩm as determined by IEC 60156. In an aspect, the dielectric fluid has a DC resistivity at 90° C. of greater than 20 GΩm as determined by IEC 60156.

In an aspect, the dielectric fluid is used in a device that is an electrical system requiring electrical insulation and cooling. In an aspect, the dielectric fluid acts to both transfer heat from the point of generation and to insulate the conductive elements, such as wire coils, from adjacent conductive elements. In an aspect, the dielectric fluid is used in a device that is an electrical network providing interconnection of electrical components, such as for computing, electrical distribution, generation of power or transformation of power. In an aspect, the dielectric fluid is used in a device that comprises a component selected from capacitors; voltage regulators; voltage compensators; and phase shifters. In an aspect, the dielectric fluid is used in a device selected from liquid insulated electrical apparatus, such as electronic circuits and liquid insulated electrical boards and panels. In an aspect, the dielectric fluid is used in a device that is a switchgear. In an aspect, the dielectric fluid is used in a device that is a data center computer module. In an aspect, the dielectric fluid is used in a device selected from transformers comprising a housing, a core/coil assembly in the housing, wherein the dielectric fluid at least partially surrounds the core/coil assembly. In an aspect, the dielectric fluid is used in a device selected from transformers such as autotransformers, generator step down and step up transformers, interconnection transformers, flexible AC transformers, distribution transformers (pole mounted, pad mounted, vault/underground units, submersible, substation), phase-shifting transformers, static voltage compensators, HVDC transformers, furnace and other industrial transformers, traction transformers, and earthing transformers. In an aspect, the dielectric fluid is used in a device selected from reactors, battery banks, and battery systems.

In an aspect, a method of insulating a device that is an electrical system requiring electrical insulation and cooling comprises incorporating of any of the dielectric fluids described herein (including selected dielectric fluids containing specifically identified materials or components, or amounts of same as described herein) in the device that is an electrical system requiring electrical insulation and cooling. In an aspect, the method of insulating a device is carried out on a device that is an electrical network providing interconnection of electrical components, such as for computing, electrical distribution, generation of power or transformation of power. In an aspect, the method of insulating a device is carried out on a device that comprises a component selected from capacitors; voltage regulators; voltage compensators; and phase shifters. In an aspect, the method of insulating a device is carried out on a device selected from liquid insulated electrical apparatus, such as electronic circuits and liquid insulated electrical boards and panels. In an aspect, the method of insulating a device is carried out on a device that is a data center computer module. In an aspect, the method of insulating a device is carried out on a device selected from transformers comprising a housing, a core/coil assembly in the housing, wherein the dielectric fluid at least partially surrounds the core/coil assembly. In an aspect, the method of insulating a device is carried out on a device selected from transformers such as autotransformers, generator step down and step up transformers, interconnection transformers, flexible AC transformers, distribution transformers (pole mounted, pad mounted, vault/underground units, submersible, substation), phase-shifting transformers, static voltage compensators, HVDC transformers, furnace and other industrial transformers, traction transformers, and earthing transformers. In an aspect, the method of insulating a device is carried out on a device selected from reactors, battery banks, and battery systems.

In an aspect, a device that is an electrical system requiring electrical insulation and cooling is provided that comprises of any of the dielectric fluids described herein (including selected dielectric fluids containing specifically identified materials or components, or amounts of same as described herein).

In an aspect, the device is selected from devices comprising a component selected from capacitors; voltage regulators; voltage compensators; and phase shifters.

In an aspect, the device is selected from liquid insulated electrical apparatus, such as electronic circuits and liquid insulated electrical boards and panels. In an aspect, the device is a data center computer module. In an aspect, the device is selected from transformers comprising a housing, a core/coil assembly in the housing, wherein the dielectric fluid at least partially surrounds the core/coil assembly. In an aspect, the device is selected from transformers such as autotransformers, generator step down and step up transformers, interconnection transformers, flexible AC transformers, distribution transformers (pole mounted, pad mounted, vault/underground units, submersible, substation), phase-shifting transformers, static voltage compensators, HVDC transformers, furnace and other industrial transformers, traction transformers, and earthing transformers. In an aspect, the device is selected from reactors, battery banks, and battery systems.

EXAMPLES

Procedure:

Test fluids used in the present examples, unless otherwise indicated, are an untreated refined, bleached deodorized ("RBD") soybean oil ("SBO") that is treated with 0.5% weight of reagent for evaluation in the stray gassing test. If necessary to dissolve the reagent, the fluid is warmed under nitrogen. The treated fluid is drawn into a 50 mL syringe, capped to prevent fluid loss and introduction of air, and placed in an oven at 80° C. or 120° C. for 48 hours. The syringe is removed from the oven to cool. The fluid is then tested for dissolved gases in accordance to ASTM Method D-3612 to determine the level of stray gassing.

Example 1: Comparison of RBD-SBO Fluid Comprising 0.5% Phosphite Ester (Irgafos 168) with Control Sample The results of testing for determination of the levels of gassing are presented in Table 1, below:

TABLE 1

| Phosphite compound | Hydrogen (ppm) | % $H_2$ reduction | Ethane (ppm) | % $CH_3CH_3$ reduction |
|---|---|---|---|---|
| Irgafos 168 | 158 | 73.6 | 14 | 94.3 |
| None | 599 | n/a | 246 | n/a |

Irgafos 168=tris-(2,4-di-tert-butylphenyl)phosphite

Discussion of Result:

At 80° C., the two gases indicative of thermally induced stray gas degradation are hydrogen and ethane. A significant reduction in the stray gas release of both gases was observed in the RBD-SBO fluid comprising phosphite ester as compared to the control.

Example 2: Comparison of RBD-SBO Dielectric Fluids, RBD-SBO Dielectric Fluids Comprising a Phosphite Compound, and RBD-SBO Dielectric Fluids Comprising Non-Phosphite Compound Antioxidants Non-control compositions all contained 0.5 wt. % of the identified additive (either the phosphite compound or the non-phosphite antioxidant). The RBD-SBO dielectric fluids of this example had a peroxide value of 10.

The results of testing for determination of the levels of gassing are presented in Table 2, below:

TABLE 2

| Additive/Antioxidant | Hydrogen (ppm) | % $H_2$ reduction | Ethane (ppm) | % $CH_3CH_3$ reduction |
|---|---|---|---|---|
| SAMPLE A (CONTROL) No antioxidant | 599 | n/a | 246 | n/a |
| SAMPLE B tris-(2,4-di-tert-butylphenyl)phosphite (Irganox 168) | 158 | 73.6 | 14 | 94.3 |
| SAMPLE C (COMPARATIVE) 2,4-Bis(dodecylthiomethyl)-6-methylphenol | 296 | 50.6 | 205 | 16 |
| SAMPLE D (COMPARATIVE) 2,6-Di-tert-butyl-4-(4,6-bis(octylthio)-1,3,5-triazin-2-ylamind)phenol | 492 | 17.9 | 506 | 2X increase |
| SAMPLE E (COMPARATIVE) Thiodiethylene bis[3-(3,5-di-tert-butyl-4-hydroxyphenyl)propionate] | 534 | 10.9 | 274 | 11.4% increase |
| SAMPLE F (COMPARATIVE) Benzenamine, N-phenyl-, reaction products with 2,4,4-trimethylpentene | 537 | 10.4 | 678 | 2.8X increase |
| SAMPLE G (COMPARATIVE) Benzenepropanoic acid, 3,5-bis(1,1-dimethylethyl)-4-hydroxy-, methyl ester | 544 | 9.2 | 299 | 21.5% increase |
| SAMPLE H (COMPARATIVE) Irganox L55 (diphenyl alkylamine) | 552 | 7.8 | 232 | 5.7 |
| SAMPLE I (COMPARATIVE) Didodecyl 3,3'-thiodipropionate | 754 | 25.9% increase | 134 | 54.5 |
| SAMPLE J (COMPARATIVE) Benzenepropanoic acid, 3-(2H-benzotriazol-2-yl)-5-(1,1-dimethylethyl)-4-hydroxy-, C7-9-branched and linear alkyl esters | 497 | 17 | 236 | 4.1 |
| SAMPLE K (COMPARATIVE) Decanedioic acid, bis (2,2,6,6-tetramethyl-1-(octyloxy)-4-piperidinyl) ester | 511 | 14.7 | 155 | 37 |
| SAMPLE L (COMPARATIVE) Bis(2,2,6,6,-tetramethyl-4-piperidyl)sebaceate | 568 | 5.2 | 282 | 14.6% increase |
| SAMPLE M (COMPARATIVE) 3,5,5-Trimethyl-hexanoic acid 2-[2,2,6,6-tetra-methyl-4-(3,5,5-trimethyl-hexanoyloxy)-piperidin-1-yl]-ethyl ester | 628 | 4.8% increase | 358 | 45.5% increase |
| SAMPLE N (COMPARATIVE) 2-(2H-Benzotriazol-2-yl)-4,6-ditert-pentylphenol | 678 | 13.2% increase | 178 | 27.6 |

Discussion of Results:

The dielectric fluid comprising a phosphite compound (SAMPLE B) significantly reduced gassing of both hydrogen and ethane as compared to dielectric fluids comprising a non-phosphite antioxidant. It is notable that phenolic based antioxidants comprising metal passivators (i.e. di-tert-butylphenolbenztriazoles with the additional functionality of metal surface inhibition—SAMPLES D, E, F, I, L, M, and N) actually exhibit an increase the stray gassing as compared to like compositions without the metal passivator.

Generally phosphite esters are considered to be secondary antioxidants with significantly lower antioxidant strength in relation to di-tert-butylphenolic based antioxidants. Comparison to other classes of antioxidants demonstrates that the effect of the phosphite ester is more than just an antioxidant effect. Together with the difference in oxidative stability results, this shows that the mechanism of action in inhibiting the stray gassing is likely to be a mechanism other than the antioxidant property. While not being bound by theory, it is believed that stray gassing is the result of thermally induced radical degradation. Therefore, the phosphite esters are inhibiting the stray gassing mechanism in an effective manner. Some degree of stray gas reduction is expected from removal of peroxide. The non-phosphite ester materials do not effectively reduce both gases, and some materials increase the gassing tendency of the oil.

Example 3: Comparison of RBD-SBO Low Peroxide Value Dielectric Fluids, RBD-SBO Low Peroxide Value Dielectric Fluids Comprising a Phosphite Compound, and RBD-SBO Low Peroxide Value Dielectric Fluids Comprising Non-Phosphite Compound Antioxidants Non-control compositions all contained 0.5 wt. % of the identified additive (either the phosphite compound, the non-phosphite antioxidant or other additive types). The RBD-SBO dielectric fluids of this example had a peroxide value of 0.6.

The results of testing for determination of the levels of gassing are presented in Table 3, below:

TABLE 3

| Additive Chemical name and commercial name | H2 | Hydrogen % reduction | ethane | Ethane % reduction |
|---|---|---|---|---|
| SAMPLE A (CONTROL) none | 26 | n/a | 191 | n/a |
| Phosphite compounds: | | | | |
| SAMPLE B tris-(2,4-di-tert-butylphenyl)phosphite - Irgafos 168 | 8 | 69% | 4 | 98% |
| SAMPLE C 2,4,8,10-tetraoxa-3,9-diphosphaspiro[5.5]undecane, 3,9-bis[2,6-bis(1,2-dimethylethyl)-4-methylphenoxy]- ADK STAB PEP-36 | 4 | 85% | 1 | 99% |
| SAMPLE D 1,3,7,9-tetratert-butyl-11-(2-ethylhexoxy)-5H-benzo[d][1,3,2]benzo-dioxaphosphocine ADK STAB HP-10 | 15 | 42% | 3 | 98% |
| SAMPLE E 2,2-Bis[[3-(dodecylthio)-1-oxopropoxy]methyl]propane-1,3-diyl bis[3-(dodecylthio)propionate] - ADK STAB AO-412S | 19 | 27% | 1 | 99% |
| SAMPLE F 4,4'-Isopropylidenediphenol C12-15 alcohol phosphite - ADK1500 | 12 | 54% | 1 | 99% |
| SAMPLE G diphenyl isodecyl phosphite- ADK Stab 135A | 14 | 46% | 2 | 99% |
| SAMPLE H triisodecyl phosphite- ADK Stab 3010 | 13 | 50% | 3 | 98% |
| SAMPLE I tris(nonylphenyl)phosphite- ADK Stab 1178 | 15 | 42% | 2 | 99% |
| SAMPLE J tris(nonylphenyl)phosphite- Doverphos highpure 4 | 10 | 62% | 5 | 97% |
| SAMPLE K 3,9-Bis(octadecyloxy)-2,4,8,10-tetraoxa-3,9-diphosphaspiro[5.5]undecane- ADK STAB PEP-8 | 89 | 242% increase | 20 | 90% |

TABLE 3-continued

| Additive Chemical name and commercial name | H2 | Hydrogen % reduction | ethane | Ethane % reduction |
|---|---|---|---|---|
| di-tert-butyl phenolic antioxidants: | | | | |
| SAMPLE L (COMPARATIVE) Phenol, 4,4',4"-(1-methyl-1-propanyl-3-ylidene)tris [2-(1,1-diemthylethyl)-5-methyl- ADK STAB AO-30 | 22 | 15% | 211 | 10% increase |
| SAMPLE M (COMPARATIVE) 2,4,6-Tris(3',5'-di-tert-butyl-4'-hydroxybenzyl)mesitylene- ADK STAB AO-330 | 49 | 88% increase | 311 | 63% increase |
| SAMPLE N (COMPARATIVE) pentaerythritol tetrakis(33-(3,5-di-tert-butyl-4-hydroxyphenyl)proprionate- Irganox L101 | 156 | 500% increase | 306 | 60% increase |
| SAMPLE O (COMPARATIVE) hexamethylene bis[3-(3,5-di-tert-butyl-4-hydroxyphenyl)propionate]- Irganox 1726 | 30 | 15% increase | 2 | 99% |
| SAMPLE P (COMPARATIVE) 2,6-di-tert-butyl-4-(4,6-bis(octylthio)-1,3,5-triazin-2-ylamino) phenol- Irganox 565 | 33 | 27% increase | 242 | 27% increase |
| SAMPLE Q (COMPARATIVE) Thiodiethylene bis[3-[3,5-di-tert-butyl-4-hydroxyphenyl]propionate]- Irganox 1035 | 47 | 81% increase | 197 | 3% increase |
| SAMPLE R (COMPARATIVE) 2-(2H-benzotriazol-2-yl)-2,4-di-tert-pentylphenol Tinuvin 328 | 1616 | 6115% increase | 376 | 97% increase |
| Other additive types: | | | | |
| SAMPLE S (COMPARATIVE) Benzamide, 2-hydrooxy-N-1H-1,2,3-triazol-3-yl ADK STAB CDA-1 | 80 | 208% increase | 17 | 91% |
| SAMPLE T (COMPARATIVE) Benzenamine, N-phenyl, reaction products with 2,4,4-trimethylpentene Irganox L57 | 54 | 108% increase | 155 | 19% |
| SAMPLE U (COMPARATIVE) alkylated amine (composition unknown) Irganox L55 | 59 | 127% increase | 157 | 18% |
| SAMPLE V (COMPARATIVE) dodecyl 3-(3-dodecoxy-3-oxopropyl)sulfanylpropanoate (or dilauryl thiodipropianate) Irganox P5800FL | 62 | 138% increase | 3 | 98% |
| SAMPLE W (COMPARATIVE) Decanedioic acid, bis(2,2,6,6-tetramethyl-1-(octyloxy)-4-piperidinyl)ester Tinuvin 123 | 93 | 258% increase | 70 | 63% |

TABLE 3-continued

| Additive Chemical name and commercial name | H2 | Hydrogen % reduction | ethane | Ethane % reduction |
|---|---|---|---|---|
| SAMPLE X (COMPARATIVE) Bis(2,2,6,6-tetramethyl-4-piperidyl)sebaceate Tinuvin 770 DF | 30 | 15% increase | 269 | 41% increase |
| SAMPLE Y (COMPARATIVE) 12H-dibenzo[d,g] [1,3,2]dioxaphocin,2,4,8,10-tetrakis(1,1-dimethylethyl)-6-hydroxy-,6-oxide, sodium salt[1] ADK STAB NA-11 | 47 | 81% increase | 265 | 39% increase |

[1]Incorporated to limit of solubility, which is less than 0.5 wt. %.

Discussion of Results:

The dielectric fluid comprising a phosphite compound (SAMPLES B-J) significantly reduced gassing of both hydrogen and ethane as compared to dielectric fluids comprising a non-phosphite antioxidant. SAMPLE K exhibited an increase in hydrogen gassing, but a decrease of ethane gassing. However, this data is based on only a single experimental run, and it is believed that the integrity of the phosphite sample may have been compromised.

In contrast, the low peroxide value dielectric fluids comprising di-tert-butyl phenolic antioxidants or other types of additives increased both hydrogen and ethane gassing. This test establishes that incorporation of phosphite compounds prevents gassing in dielectric fluids when other additives do not prevent gassing in like dielectric fluids that do not contain a phosphite component.

In all subsequent examples, RBD-refined, bleached, deodorized vegetable oil, or synthetic ester oils, are purified by clay treatment before use to obtain dielectric grade fluids. Stray gassing tests are run by holding the air saturated oils in an oven at either 80° C. or 120° C. for either 48 hours or 168 hours, as noted.

Example 4: Effectiveness of Phosphites in Controlling Stray Gassing at 80° C. (48 Hour Test) in Comparison to Other Stabilizers, Antioxidants, Passivators Table 4 demonstrates how RBD soybean oil that has been heated to 80° C. for 48 hours is affected by various additives. The primary indicators are hydrogen and ethane. Levels of other gases are insignificant in these examples. Sample 4-1 is the RBD-SBO without additives and thermal treatment to compare the base level of stray gases, analyzed by dissolved gas analysis (DGA). Sample 4-2 is RBD-SBO without additives after thermal treatment. Out of all of the classes of antioxidants tested, the phosphite compound shows a significant reduction in both of the stray gases. The other examples show either no significant change, or an increase in either or both stray gases.

TABLE 4

Initial data demonstrating effectiveness of phosphites in controlling stray gassing at 80° C. (48 hour test) in comparison to other stabilizers, antioxidants, passivators, etc. RBD-SBO was used with 0.5% weight of additive.

| Sample Number | Antioxidant | AO Class | Hydrogen (ppm) | Ethane (ppm) |
|---|---|---|---|---|
| 4-1 | RBD-SBO, Not heated | No additives | 50 | 14 |
| 4-2 | RBD-SBO, heated | No additives | 599 | 246 |
| 4-3 | Irgaphos 168 | Phosphite | 158 | 19 |
| 4-4 | Irganox L55 | Alkylated amine (diphenylamine based antioxidant) | 552 | 232 |
| 4-5 | Irganox PS800FL | thiosynergist (peroxide decomposer) | 754 | 134 |
| 4-6 | TInuvin 249 | HALS (hindered amine light stabilizer) | 628 | 358 |
| 4-7 | Irganox 1035 | DTBP (di-tert-butylphenol) derived antioxidant | 534 | 274 |
| 4-8 | Tinuvin 770 DF | HALS | 568 | 282 |
| 4-9 | Irganox L57 | Aryl amine antioxidant | 537 | 687 |
| 4-10 | Tinuvin 328-2 | Hydroxyphenyl-benzotriazole (antioxidant and passivator) | 678 | 178 |
| 4-11 | Irganox 1726 | Thiomethyl phenol antioxidant | 296 | 205 |
| 4-12 | Irganox 565 | DTPB amine triazine alkyl sulfide AO | 492 | 506 |
| 4-13 | Irganox L135 | DTPB methyl ester | 544 | 299 |
| 4-14 | Tinuvin 123 | HALS amino-ether | 511 | 155 |
| 4-15 | Tinuvin 384-2 | Hydroxyphenyl-benzotriazole (AO + passivator + UV protectant | 497 | 236 |

From this data, it is apparent that butylated phenol antioxidants do not control stray gassing, but can contribute to a significant increase of stray gassing in bio-sourced oils. Passivator compounds, which are generally benzotriazole compounds (Examples 4-10, 4-12 and 4-15), also significantly increase stray gassing in bio-sourced oils.

Example 5: Negative Interactions of the Butylated Phenol, Irganox L101 and the Passivator The interaction of one of the most common antioxidants used in transformer oils, Irganox L101 (butylated phenol class), and the most common passivator, Irgamet 39, is shown in contrast or in conjunction with the phosphite compound Irgaphos 168 in Table 5.

TABLE 5

The Negative Interactions of the Butylated Phenol, Irganox L101 and the Passivator Irgamet 39, Against the Compensating Impact of Irgaphos 168 Phosphite on Controlling Stray Gassing in RBD-SBO at 80° C. for 48 hours.

| Sample Number | Irgaphos 168 % wt. | Irganox L101 % wt. | Irgamet 39 ppm | Hydrogen ppm | Ethane ppm |
|---|---|---|---|---|---|
| 5-16 | 0 | 0 | 0 | 15 | 316 |
| 5-17 | 0 | 0.4 | 0 | 56 | 325 |

TABLE 5-continued

The Negative Interactions of the Butylated Phenol, Irganox
L101 and the Passivator Irgamet 39, Against the Compensating
Impact of Irgaphos 168 Phosphite on Controlling Stray
Gassing in RBD-SBO at 80° C. for 48 hours.

| Sample Number | Irgaphos 168 % wt. | Irganox L101 % wt. | Irgamet 39 ppm | Hydrogen ppm | Ethane ppm |
|---|---|---|---|---|---|
| 5-18 | 0.4 | 0 | 0 | <2 | <1 |
| 5-19 | 0.2 | 0.4 | 0 | 6 | <1 |
| 5-20 | 0.4 | 0.8 | 0 | 4 | 8 |
| 5-21 | 0 | 0 | 100 | 516 | 23 |
| 5-22 | 0 | 0.4 | 100 | 228 | 128 |
| 5-23 | 0 | 0.8 | 400 | 216 | 45 |
| 5-24 | 0.4 | 0 | 400 | 66 | 6 |
| 5-25 | 0.4 | 0.2 | 400 | 56 | 4 |
| 5-26 | 0.2 | 1.0 | 100 | 25 | 4 |
| 5-27 | 0.8 | 0.6 | 100 | 15 | 2 |
| 5-28 | 0.8 | 1.0 | 100 | 14 | 2 |

Comparison of Samples 5-16 and 5-17 demonstrates that incorporation of the traditional butylated phenol increases the stray gassing over that of purified soybean oil by increasing the release of hydrogen by 370%. In contrast, comparison of Samples 5-16 and 5-18 demonstrates significant reduction of the stray gassing by the use of phosphite compounds, even reducing the levels below that of the purified, untreated oil. Samples 5-19 and 5-20 demonstrate that the phosphite compounds even reverse the stray gassing effect of the butylated phenol. Samples 5-20, 5-21, and 5-22 show the negative impact of passivator on oils, where a small amount of passivator has a severe detrimental effect on stray gassing on the oils. Samples 5-24 through 5-28 demonstrate how the Irgaphos 168 phosphite compound overcomes the stray gassing effects of the combination of butylated phenol antioxidant and benzotriazole passivator.

Example 6: Effect of Typical Antioxidants in Increasing the Stray Gases

The general behavior of typical antioxidants in increasing the stray gases is demonstrated in Table 6. These compounds are classified as butylated phenols, di-t-butyl phenolic thiotriazine, di-t-butylphenolic mercaptan, di-t-butyl phenolic benzotriazine, aminotriazole, benzamines, mercaptan diester, piperidinyl ester-N-alkoxide piperidinyl ester

TABLE 6

Increase of Stray Gases in RBD-SBO at 80° C. for 48 hours from the Use of 0.5% Weight Antioxidant.

| Antioxidant | Chemical Name | Hydrogen (ppm) | Increase (%) | Ethane (ppm) | Increase (%) |
|---|---|---|---|---|---|
| None | Control | 26 | n/a | 191 | n/a |
| AO-30 | Phenol, 4,4',4''-(1-methyl-1-propanyl-3-ylidene)tris[2-(1,1-diemthylethyl)-5-methyl- | 22 | −15% | 211 | 10% increase |
| AO-330 | 2,4,6-Tris(3',5'-di-tert-butyl-4'-hydroxybenzyl)mesitylene | 49 | 88% increase | 311 | 63% increase |
| Irganox L101 | pentaerythritol tetrakis(33-(3,5-di-tert-butyl-4-hydroxyphenyl)proprionate | 156 | 500% increase | 306 | 60% increase |
| Irganox 1726 | hexamethylene bis[3-(3,5-di-tert-butyl-4-hydroxyphenyl)propionate] | 30 | 15% increase | 2 | −99% |
| Irganox 565 | 2,6-di-tert-butyl-4-(4,6-bis(octylthio)-1,3,5-triazin-2-ylamino) phenol | 33 | 27% increase | 242 | 27% increase |
| Irganox 1035 | Thiodiethylene bis[3-[3,5-di-tert-butyl-4-hydroxyphenyl]propionate] | 47 | 81% increase | 197 | 3% increase |
| Tinuvin 328 | 2-(2H-benzotriazol-2-yl)-2,4-di-tert-pentylphenol | 1616 | 6115% increase | 376 | 97% increase |
| CDA-1 | Benzamide, 2-hydrooxy-N-1H-1,2,3-triazol-3-yl | 80 | 208% increase | 17 | −91% |
| Irganox L57 | Benzenamine, N-phenyl, reaction products with 2,4,4-trimethylpentene | 54 | 108% increase | 155 | −19% |
| Irganox L55 | alkylated amine (trade secret) | 59 | 127% increase | 157 | −18% |
| Irganox P5800FL | dodecyl 3-(3-dodecoxy-3-oxopropyl)sulfanylpropanoate (or dilauryl thiodipropianate) | 62 | 138% increase | 3 | −98% |
| Tinuvin 123 | Decanedioic acid, bis(2,2,6,6-tetramethyl-1-(octyloxy)-4-piperidinyl)ester | 93 | 258% increase | 70 | −63% |
| Tinuvin 770 DF | Bis(2,2,6,6-tetramethyl-4-piperidyl)sebaceate | 30 | 15% increase | 269 | 41% increase |
| NA-11 | 12H-dibenzo[d,g][1,3,2]dioxaphocin,2,4,8,10-tetrakis(1,1-dimethylethyl)-6-hydroxy-,6-oxide, sodium salt | 47 | 81% increase | 265 | 39% increase |

Example 7: Reduction of Stray Gassing in Oil by Phosphite Compounds

A screening of phosphite compounds demonstrates the generality of the ability of these compounds to reduce stray gassing in oils.

Table 7 demonstrates the benefits of treating purified, refined, bleached, deodorized soybean oil with 0.5% of the listed phosphite, then heating the in a sealed container for 48 hours at 80° C., then testing the oil for dissolved gases.

TABLE 7

Screening of Phosphite Compounds for Reduction of Stray Gassing in RBD-SBO at 80° C. for 48 hours.

| Phosphite | Chemical Name | Hydrogen ppm | % reduction | Ethane ppm | % reduction |
|---|---|---|---|---|---|
| None | Control | 26 | n/a | 191 | n/a |
| Irgafos 168 | tris-(2,4-di-tert-butylphenyl)phosphrte | 8 | 69% | 4 | 98% |
| PEP-36 | 2,4,8,10-tetraoxa-3,9-diphosphaspiro[5.5]undecane, 3,9-bis[2,6-bis(1,2-dimethylethyl)-4-methylphenoxy]- | 4 | 85% | 1 | 99% |
| Triphenyl phosphite | Triphenyl Phosphite | <1 | 97% | 3 | 99% |
| HP-10 | 1,3,7,9-tetratert-butyl-11-(2-ethylhexoxy)-5H-benzo[d][1,3,2]benzo-dioxaphosphocine | 15 | 42% | 3 | 98% |
| AO-412S | 2,2-Bis[[3-(dodecylthio)-1-oxopro-poxy]methyl]propane-1,3-diyl bis [3-(dodecylthio)propionate] | 19 | 27% | 1 | 99% |
| ADK1500 | 4,4'-Isopropylidenediphenol C12-15 alcohol phosphite | 12 | 54% | 1 | 99% |
| ADK Stab 135A | diphenyl isodecyl phosphite | 14 | 46% | 2 | 99% |
| ADK Stab 3010 | triisodecyl phosphite | 13 | 50% | 3 | 98% |
| ADK Stab 1178 | tris(nonylphenyl)phosphite | 15 | 42% | 2 | 99% |
| Doverphos highpure 4 | tris(nonylphenyl)phosphite | 10 | 62% | 5 | 97% |

Example 8: Comparison of Butylated Phenol with Phosphite Compound in Highly Purified RBD-SBO for 18 Hours at 80° C. and 120° C.

Stray gassing of Highly Purified RBD-SBO containing either a butylated phenol, Irganox L101, or a phosphite compound, Irgaphos 168, was compared when the oil was held for 18 hours at 80° C. or 120° C. Results are shown in Table 8.

TABLE 8

Comparison of Stray gassing of Highly Purified RBD-SBO containing either a butylated phenol or a phosphite compound

| Sample Number | Temperature ° C. | Irgaphos 168 WT. % | Irganox L101 Wt. % | Hydrogen ppm | Ethane ppm |
|---|---|---|---|---|---|
| 8-1 | 80 | 0 | 0.4 | 43 | 95 |
| 8-2 | 80 | 0.4 | 0 | 6 | 8 |
| 8-3 | 120 | 0 | 0.4 | 44 | 347 |
| 8-4 | 120 | 0.4 | 0 | 30 | 85 |

Example 9: Evaluation of Stray Gassing of Aliphatic Synthetic Ester Compositions Comprising Benzotriazole Passivator and Phosphite at Various Levels Temperatures of 120° C. are known to accelerate natural and synthetic ester degradation. This was verified with untreated mineral oil and synthetic ester at 80° C. in the oven test where the higher stability of aliphatic based oils was demonstrated with the lack of stray gassing. The increased stability of the aliphatic compounds requires temperatures above 100° C. to increase the rate of stray gassing. Samples were tested for both 48 hours and 168 hours at 120° C. Table 9A demonstrates results after 48 hours of thermal treatment at 120° C.

TABLE 9A

Stray Gassing of Aliphatic Synthetic Ester at 120° C. for 48 Hours and Stabilizing Effect of Irgaphos 168 Phosphite.

| Sample Number | Irgaphos 168 wt. % | Irganox L101 wt. % | Irgamet 39 ppm | Hydrogen ppm | Ethane ppm |
|---|---|---|---|---|---|
| Midel 7131 | 0 | Level unknown | Level unknown | 81 | 317 |
| 9-29 | 0 | 0 | 0 | 57 | 82 |
| 9-30 | 0 | 0.4 | 0 | 13 | <1 |
| 9-31 | 0 | 0.4 | 400 | 329 | <1 |
| 9-32 | 0.4 | 0 | 400 | <2 | <1 |
| 9-33 | 0.4 | 0.4 | 400 | 5 | 72 |

The commercial synthetic ester sample Midel 7131, known to have Irganox L101 and passivator at undetermined levels, shows high levels of stray gassing within the shorter time period than the synthetic ester fluid used in this study. At the elevated temperatures where butylated phenols are known to act more rapidly toward peroxide induced stray gassing (compare sample 9-29 and 9-30), the effect of benzotriazole passivator is shown to overcome any effect of the butylated phenol and significantly increase the hydrogen stray gases (sample 9-31). The phosphite compound, Irgaphos 168, significantly reduces the hydrogen stray gassing in the synthetic ester in samples 9-32 and 9-33.

Increasing the severity of the exposure by extending the time to 168 hours at 120° C. (Table 9B) demonstrates the superiority of the phosphite compound in controlling stray gassing under the challenge of other additives.

TABLE 9B

Stray Gassing of Aliphatic Synthetic Ester at 120° C. for 168 Hours and Stabilizing Effect of Irgaphos 168 Phosphite.

| Sample Number | Irgaphos 168 wt. % | Irganox L101 wt. % | Irgamet 39 ppm | Hydrogen ppm | Ethane ppm |
|---|---|---|---|---|---|
| 9-34 | 0 | 0 | 0 | 135 | 58 |
| 9-35 | 0 | 0.4 | 400 | 228 | <1 |
| 9-36 | 0.4 | 0 | 400 | <2 | <1 |
| 9-37 | 0.4 | 0.2 | 400 | <2 | <1 |
| 9-38 | 0.4 | 0.4 | 400 | <2 | <1 |

Example 10: Demonstration of Irgaphos 168 Phosphite Compound in Preventing Stray Gassing in Mineral Oil Temperatures of 120° C. are known to degrade mineral oils. Table 10 demonstrates the high rate of stray gassing in a mineral oil fluid without additives, and the ability of phosphite compound to prevent stray gassing.

TABLE 10

Demonstration of Irgaphos 168 phosphite compound in preventing stray gassing in mineral oil.

| Sample Number | Irgaphos 168 wt. % | Hydrogen ppm | Methane ppm | Ethane ppm | Ethylene ppm |
|---|---|---|---|---|---|
| 10-39 | 0 | 31 | 444 | 413 | 14 |
| 10-40 | 0.4 | <2 | 4 | <1 | 2 |

Example 11: Oxidative Stability Test Results on RBD-SBO with and without Phosphite and Passivator Oxidative stability testing of the soybean oil formulations (Table 11) indicates that Irgaphos 168 can be used in formulations with improvement in total acidity (specification <0.3 total). However, the use of passivator with biosourced oils has been found to significantly increase viscosity and acidity of the fluids. In the case of aliphatic synthetic esters, passivator does not affect viscosity, but has a detrimental effect on acidity and dissipation factor (tan δ) of the fluids as demonstrated in Table 12.

TABLE 11

Oxidative Stability Test Results on RBD-SBO (IEC 61125 Method C, 48 hrs, 120° C., 2.5 mL/min air flow).

| Irgaphos 168 wt. % | Irganox L101 wt. % | Irgamet 39 ppm | Total acids mg KOH/g (spec. ≤ 0.3) | Viscosity Increase % (spec. ≤ 30%) | tan delta (90° C.) (spec. ≤ 0.5) |
|---|---|---|---|---|---|
| 0 | 0 | 0 | 0.292 | 21.5% | 0.03719 |
| 0.4 | 0 | 0 | 0.026 | 21.8% | 0.03267 |
| 0.4 | 0.2 | 0 | 0.132 | 24.2% | 0.07850 |
| 0.4 | 0.2 | 200 | 0.279 | 33.9% | 0.17850 |

Example 12: Oxidative Stability Test Results on Aliphatic Synthetic Ester

Aliphatic synthetic ester fluid formulated with the Irgaphos 168 phosphite compound shows superior properties in the oxidative stability test. Viscosities remain unchanged when using Irgaphos 168, and the results of testing after 800 hours of oxidative stability testing at 120° C. with according to IEC 61125, Method C, at a 2.50 mL/min flow of air, exceeds the specifications required for the 164 hour test. Results are summarized in Table 12.

TABLE 12

Oxidative Stability Test Results on Aliphatic Synthetic Ester (IEC 61125 Method C, 120° C., 2.5 mL/min air flow, at the specified times of 164 or 800 hours).

| Irgaphos 168 wt. % | Irganox L101 wt. % | Irgamet 39 ppm | Test Duration (hours) (spec = 164) | Total acids mg KOH/g (spec. ≤ 0.3) | tan delta (90° C.) (spec. ≤ 0.5) | Color (Hazen) (<200) |
|---|---|---|---|---|---|---|
| 0.25 | 0 | 400 | 200 | 8.061 | 0.1175 | 62.3 |
| 0.25 | 0 | 200 | 200 | 1.0273 | 0.0815 | 85 |
| 0.4 | 0 | 200 | 200 | 0.185 | 0.0393 | 101 |
| 0.5 | 0 | 200 | 200 | 0.1136 | 0.0788 | 356 |
| 0.5 | 0 | 400 | 200 | 0.142 | 0.0284 | 97 |
| 0.2 | 0.2 | 400 | 164 | 0.0840 | 0.0325 | 103 |
| 0.5 | 0.2 | 400 | 164 | 0.0838 | 0.0325 | 103 |
| 0.5 | 0.2 | 400 | 164 | 0.1133 | 0.0514 | 123 |
| 0.5 | 0 | 400 | 164 | 0.0849 | 0.1308 | 426 |
| 0.2 | 0.2 | 0 | 800 | 0.1215 | 2.58 | >1000 |
| 0.5 | 0 | 400 | 800 | 0.2102 | 0.0642 | 354 |
| 0.5 | 0 | 400 | 800 | 0.1343 | 0.0945 | 317 |

Note:
Viscosity change in all cases is <1.0%, and sludge is <0.01% weight.

Example 13: Reduction of Stray Gassing in Natural Oils Having High Peroxide Values Oils having high initial peroxide content also exhibit increased stray gassing, as is seen in Table 13. However, this stray gassing is significantly reduced by the use of the Irgaphos 168 phosphite compound. It is noted that the presence of a conventional antioxidant (non-phosphite antioxidant component) does not prevent formation of peroxide, but instead acts to degrade peroxides after the peroxide is formed. However, the conventional antioxidant will not effectively reduce peroxide buildup at ambient temperature. Elevated temperature is effective at increasing the interaction between the conventional antioxidant and peroxide, but also increases the rate of thermal degradation of the oil.

TABLE 13

High Peroxide Value oils and the effect of Irganox 168 to reduce stray gassing (48 hours, 80° C.).

| Example Number | Oil | Peroxide Number | Irgaphos 168 % wt. | Irganox L101 % wt. | Irgamet 39 % wt. | Hydrogen ppm | Ethane ppm |
|---|---|---|---|---|---|---|---|
| 13-16 | RBD-SBO | <1 | 0 | 0 | 0 | 15 | 316 |
| 13-41 | RBD-SBO | 20 No heat | 0 | 0 | 0 | 182 (no heat) | 15 (no heat) |
| 13-42 | RBD-SBO | 20 | 0 | 0 | 0 | 1391 | 294 |
| 13-43 | RBD-SBO | 24 | 0.4 | 0 | 0 | 22 | 16 |
| 13-44 | Sunflower | 46 | 0 | 0.4 | 100 | 3778 | 12 |
| 13-45 | Sunflower | 46 | 0.4 | 0 | 100 | 635 | 180 |
| 13-46 | US Canola | 73 | 0 | 0.4 | 110 | 11089 | 2295 |
| 13-47 | US Canola | 73 | 0.4 | 0 | 110 | 635 | 1808 |

Example 14: Reduction of Stray Gassing in Natural Oils Having Low Peroxide Content Experiments were carried out showing reduction of stray gassing in natural oils that do not have high peroxide content Test results are provided in Tables 14-1 and 14-2.

TABLE 14-1

Effectiveness of Irganox 168 at Reducing Stray Gassing in Bio-Sourced Oils at 80° C. for 48 hours.

| Sample Number | Oil Type | Irgaphos 168 wt. % | Irganox L101 wt. % | Irgamet 39 ppm | Hydrogen ppm | Ethane ppm |
|---|---|---|---|---|---|---|
| 14-1 | High Oleic Canola | 0 | 0.4 | 0 | 132 | 17 |
| 14-2 | High Oleic Canola | 0.4 | 0 | 0 | 17 | 5 |
| 14-3 | US Canola | 0 | 0.4 | 100 | 294 | 69 |
| 14-4 | US Canola | 0 | 0.4 | 0 | 61 | 45 |
| 14-5 | US Canola | 0.4 | 0 | 100 | 6 | 12 |
| 14-6 | US Canola | 0.4 | 0 | 0 | 6 | <1 |
| 14-7 | Sunflower | 0 | 0 | 200 | 282 | <1 |
| 14-8 | Sunflower | 0.4 | 0 | 200 | 7 | <1 |
| 14-9 | Sunflower | 0.4 | 0.35 | 0 | <2 | <1 |
| 14-10 | Sunflower | 0.4 | 0.35 | 200 | <2 | <1 |
| 14-11 | EU Rapeseed | 0 | 0.4 | 0 | 50 | 44 |
| 14-12 | EU Rapeseed | 0.4 | 0 | 0 | 6 | 9 |

TABLE 14-2

Examples of the Phosphite Compound, Triphenyl Phosphite, on various oils AT 80° C. for 48 Hours.

| Sample Number | Oil Type | $P(OPh)_3$ wt. % | Irganox L101 wt. % | Irgamet 39 ppm | Hydrogen ppm | Ethane ppm |
|---|---|---|---|---|---|---|
| 14-13 | High Oleic Canola | 0 | 0.4 | 100 | 2591 | 170 |
| 14-14 | High Oleic Canola | 0.4 | 0 | 0 | 2 | 15 |
| 14-15 | EU Rapeseed | 0.4 | 0 | 0 | <2 | 9 |
| 14-16 | High Peroxide Sunflower (PV = 46) | 0.4 | 0 | 0 | 11 | 3 |
| 14-17 | RBD-SBO | 0.4 | 0 | 0 | <2 | 3 |
| 14-18 | US Canola | 0.5 | 0 | 0 | 2 | 15 |

Example 15: Confirming that Phosphite in Oil does not Interfere with Testing of Transformers It is important that the phosphite compounds do not interfere with the diagnostic testing of transformers, where acetylene levels are used to determine whether an arcing or electrical discharge situation is occurring. To test this, the oil was subjected to greater than 65 kV and 50 electrical discharges that were sent through a 2 mm gap into 350 mL of oil to demonstrate that there was no difference in the acetylene and DGA levels. It should be noted that this oil was not heat treated, so no additional stray gases were expected from anything other than the spark going through the oil.

TABLE 15

Demonstration of Non-Interference of Phosphite Compound, Irgaphos 168, on the Electrical Discharge Diagnosis of Bio-Sourced Oil (RBD-SBO).

| Irgaphos 168 Wt. % | Irgamet 39 ppm | Hydrogen ppm | Methane ppm | Ethane ppm | Ethylene ppm | Acetylene ppm |
|---|---|---|---|---|---|---|
| 0 | 0.4 | 21 | 5 | 1 | 11 | 36 |
| 0.4 | 0 | 20 | 4 | <1 | 9 | 31 |

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by 1/10 of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values. Alternatively, particularly with respect to measurements on logarithmic scales such as seen in biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A dielectric fluid comprising a vegetable oil selected from the group consisting of canola oil, rapeseed oil, sunflower oil, soybean oil, and mixtures thereof;
 a phosphite component comprising one or more phosphite compounds selected from phosphite compounds having one to three aryloxy groups; and
 a phenolic antioxidant component,
 wherein the phosphite component is present in an amount of from 0.1 to 0.5 wt % and the amount of the phosphite component is sufficient to reduce the stray gassing of the dielectric fluid as determined by dissolved gas analysis (ATSM D3612-02, Method C) by at least 60% as compared to a like dielectric fluid composition that does not contain a phosphite component, wherein the stray gas is hydrogen, ethane, methane or ethylene, and wherein the dielectric fluid has a breakdown voltage of at least 45 kV as determined by IEC 60156.

2. The dielectric fluid of claim 1, wherein the phosphite component comprises three aryloxy groups.

3. The dielectric fluid of claim 1, wherein the phenolic antioxidant component is selected from the group consisting of butylated hydroanisole; butylated hydrotoluene; tertiary butylhydroquinone; tetrahydrobutrophenone; propyl gallate; alpha-, beta- or delta-tocopherol; and mixtures thereof.

4. The dielectric fluid of claim 1, wherein the phenolic antioxidant component is selected from the group consisting of Pentaerythritol tetrakis(3-(3,5-di-tert-butyl-4-hydroxyphenyl)propionate); Hexamethylene bis[3-(3,5-di-tert-butyl-4-hydroxyphenyl)propionate]; Octadecyl-[3-(3,5-di-tert-butyl-4-hydroxyphenyl)propionate]; Ethylene bis (oxyethylene) bis-(3-(5-tert-butyl-4-hydroxy-m-tolyl) propionate); 2,6-Di-tert-butyl-4-(4,6-bis(octylthio)-1,3,5-triazin-2-ylamino)phenol; N,N'-hexane-1,6-diylbis(3-3,5-di-tert-butyl-4-hydroxyphenylpropionamide); 4,6-Bis (octylthiomethyl)-o-cresol; 4,4'-methylene-bis-2,6-di-tert-butyl phenol; and 2,6-Di-tert-butyl-4-methylphenol.

5. The dielectric fluid of claim 1, wherein the dielectric fluid comprises a vegetable oil selected from the group consisting of canola oil, rape seed oil, and sunflower oil, and mixtures thereof.

6. The dielectric fluid of claim 1, wherein the dielectric fluid comprises a vegetable oil selected from the group consisting of rape seed oil, canola oil, and mixtures thereof.

7. The dielectric fluid of claim 1, wherein the dielectric fluid comprises a vegetable oil having an IV of from 50 to 200.

8. The dielectric fluid of claim 1, wherein the dielectric fluid has a peroxide value of less than 5; or wherein the dielectric fluid has a peroxide value of less than 3; or wherein the dielectric fluid has a peroxide value of less than 2; or wherein the dielectric fluid has a peroxide value of less than 1; or wherein the dielectric fluid has a peroxide value of from about 0.01 to 5; or wherein the dielectric fluid has a peroxide value of from about 0.01 to 3; or wherein the dielectric fluid has a peroxide value of from about 0.01 to 2; or wherein the dielectric fluid has a peroxide value of from about 0.01 to 1; or wherein the dielectric fluid has a peroxide value of from about 0.1 to 1.

9. A dielectric fluid formulated for use in an electrical distribution or power device, the dielectric fluid comprising a vegetable oil selected from the group consisting of rape seed oil, canola oil, sunflower oil, soybean oil, and mixtures thereof;
a phosphite component comprising one or more phosphite compounds selected from phosphite compounds having one to three aryloxy groups; and
a phenolic antioxidant component,
wherein the phosphite component is present in an amount of from 0.1 to 0.5 wt % and the amount of the phosphite component is sufficient to reduce the stray gassing of the dielectric fluid as determined by dissolved gas analysis (ATSM D3612-02, Method C) by at least 60% as compared to a like dielectric fluid composition that does not contain a phosphite component, wherein the stray gas is hydrogen, ethane, methane or ethylene, and wherein the dielectric fluid has a breakdown voltage of at least 45 kV as determined by IEC 60156.

10. An electrical distribution or power device comprising a dielectric fluid of claim 1.

11. The electrical distribution or power device of claim 10, wherein the device is selected from a capacitor and a transformer.

12. The electrical distribution or power device of claim 10, wherein the device is a transformer.

13. The dielectric fluid of claim 1, wherein the phosphite component is present in an amount of from 0.1 to 0.5 wt % and the amount of the phosphite component is sufficient to reduce the stray gassing of the dielectric fluid as determined by dissolved gas analysis (ATSM D3612-02, Method C) by at least 60% as compared to a like dielectric fluid composition that does not contain a phosphite component, wherein the stray gas is ethane.

* * * * *